United States Patent

[11] 3,575,364

| [72] | Inventor | Norman L. Frederick<br>San Diego, Calif. |
|---|---|---|
| [21] | Appl. No. | 746,531 |
| [22] | Filed | July 22, 1968 |
| [45] | Patented | Apr. 20, 1971 |
| [73] | Assignee | General Dynamics Corporation<br>San Diego, Calif. |

[54] FLEXIBLE TRACK
3 Claims, 4 Drawing Figs.

[52] U.S. Cl................................................ 248/2,
173/32, 266/23
[51] Int. Cl.................................................F16m 11/00
[50] Field of Search.......................................... 248/2;
266/23 (K), 23 (N); 219/124, 125, 126; 33/189;
308/3; 161/180; 173/32, 33, 24

[56] References Cited
UNITED STATES PATENTS

| 3,485,306 | 12/1969 | Gulley.......................... | 173/24X |
| 2,687,880 | 8/1954 | Waterson..................... | 266/23 |
| 2,705,629 | 4/1955 | Miller........................... | 266/23 |
| 3,346,227 | 10/1967 | Hankin......................... | 16/94X |
| 3,351,143 | 11/1967 | Seibold......................... | 173/32X |

Primary Examiner—Edward C. Allen
Assistant Examiner—J. Franklin Foss
Attorney—Neil F. Martin ABSTRACT: A flexible track of modular construction for mounting a tool holding carriage on to a structure or workpiece. The track is preferably fabricated from a flexible plastic material such as a fiber-resin composition to permit its being contoured into conformity with the particular configuration of the structure upon which it is to be mounted for purposes of conducting welding or machining operations. Vacuum cavities in the track base provide holding means for securing the track to the structure by application of vacuum pressure. The carriage is mounted on the flexible track by engagement of its rollers with rails extending laterally from the track base. A rack gear extending along the length of the track module is engaged by the drive gear of the carriage whereby movement of the carriage along the track is achieved and maintained under positive control.

Patented April 20, 1971 3,575,364

INVENTOR.
NORMAN L. FREDERICK
BY *Neil F. Martin*
ATTORNEY

3,575,364

FLEXIBLE TRACK

BACKGROUND OF THE INVENTION

Machining or welding of large contoured structures frequently requires that special tooling be constructed to conform to the particular contour of the structure. Upon completing the work on the structure, the tooling becomes obsolete since it is not adaptable for use in machining or welding of structures of different contour designs. In many instances where production is limited to a minimum of number of units the special tooling required significantly increases the cost of the finished product.

SUMMARY OF THE INVENTION

The flexible track of the present invention finds application in the field of welding and/or machining of contoured structures where due to the size, bulk, or other considerations, it is advantageous to employ machinery or welding apparatus of portable design. The flexible track is preferably fabricated from a fiber-resin composition of such resiliency as to permit its being formed to correspond with the contour of the workpiece structure and to assume a serpentine shape on the structure where required. The base of the track is cavitated, having means connected therewith for attachment to a suitable vacuum pump. Thus the track may be positioned on a workpiece structure in any desired location and be securely attached thereto by application of vacuum pressure. A pair of laterally disposed rails projecting from the track base provide means to mount a tool holding carriage onto the track. The tool holding carriage, which is not a part of the present invention, is of a usual construction having a platform upon which a machine or welding tool is mounted and rollers or wheels attached to the underside thereof adapted to engage the rails of the track for purposes of guidance and retainment of the carriage onto the track. A gear driven by a suitable motor mounted on the carriage, engages a linear gear or rack on the track to provide movement of the carriage therealong at a constant and controlled velocity rate. The track is of modular construction to accommodate installation on various lengths and diameter structures.

An object of the present invention is to provide a flexible track for guiding and supporting a movable tooling carriage onto a workpiece.

Another object of this invention is to provide a flexible track which secures itself to a workpiece by vacuum pressure.

Another object of this invention is to provide a flexible track which may be twisted or curved into a variety of configurations to conform to the shape of the workpiece to which it is to be attached.

Other objects and features of the present invention will be readily apparent to those skilled in the art from the following specification and appended drawings wherein is illustrated a preferred form of the invention, and in which.

Figure 1:
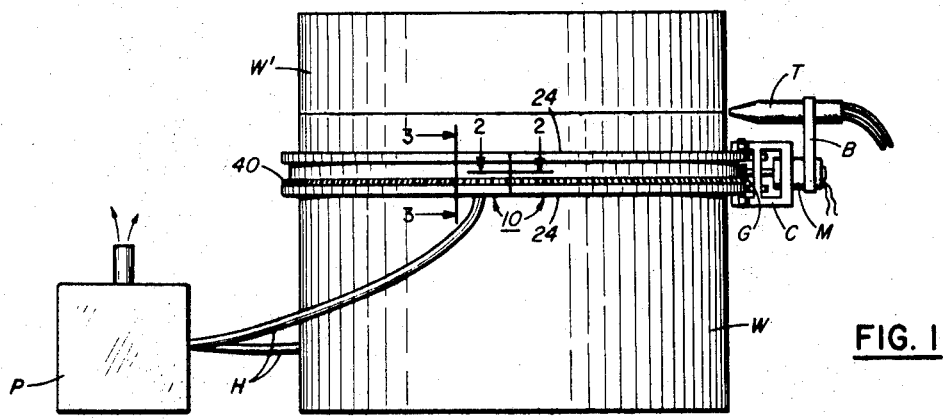
FIG. 1 is a front elevational view of the flexible track modules of the present invention shown mounted on a workpiece and further showing a vacuum pump attached thereto and a tool holding carriage mounted thereon.
Figure 2:
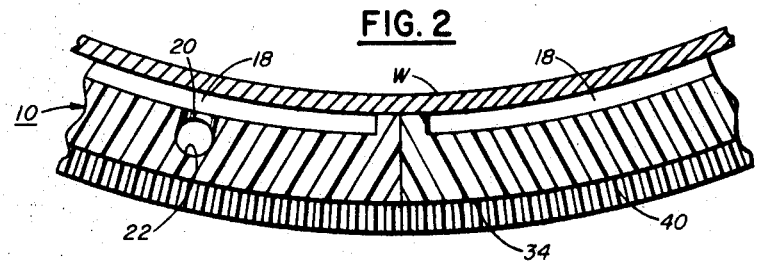
FIG. 2 is an enlarged longitudinal cross-sectional view through the tracks at the abutment of one module to another taken on the line 2–2 of FIG. 1.
Figure 4:
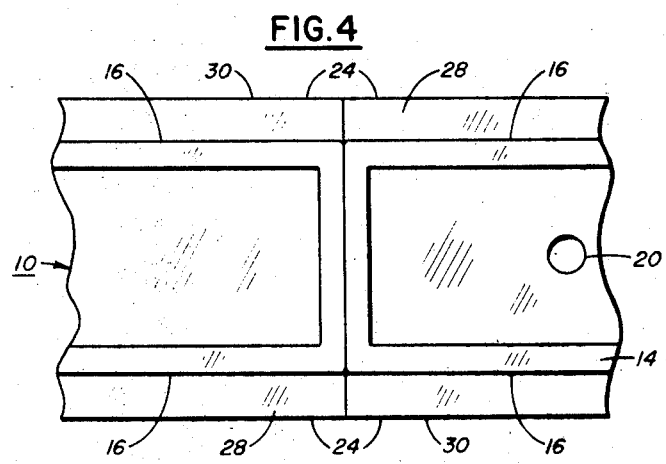
FIG. 4 is a rear elevational view of the track modules as viewed in the direction of the arrow 4 of FIG. 3.
Figure 3:
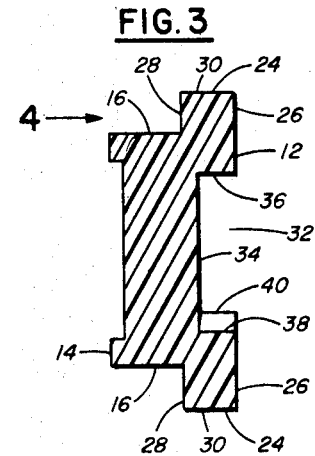
FIG. 3 is an enlarged transverse cross-sectional view through one of the track modules taken on the line 3–3 of FIG. 1.

Referring now to FIG. 1 of the drawings, track modules 10 are shown mounted on a substantially cylindrical workpiece W to which the upper ring W' is to be welded. Track 10 comprises a base having a front 12, back 14, and sides 16. Back 14 is cavitated to form a vacuum chamber 18 when the track 10 is mounted on a workpiece W as shown in FIG. 2. Air is evacuated from chamber 18 through intersecting passageways 20 and 22. Passageway 20 opens into chamber 18 and passageway 22 opens to atmosphere through a sidewall 16.

Spaced from back 14 and extending laterally from sides 16, are a pair of parallel rails 24. Rails 24 comprise a front surface 16 coplanar with front 12, back surface 28, and a side surface 30. Intermediate rails 24, the front 12 of track 10 is provided with a recessed portion 32. Recess 32 is defined by a bottom wall 34, and sidewalls 36 and 38. Sidewall 38 forms a linear gear or rack having teeth 40 projecting therefrom into the recessed area 32.

Track 10 is preferably fabricated from a fiber-resin material of suitable flexibility to permit its being formed into various configurations as the configuration of the workpiece dictates. Exemplary of one configuration is the cylindrical application illustrated in FIGS. 1 and 2. It will be noted, however, that although the edge of the workpiece W at its joinder with the ring W' is shown as a straight line, track 10 is sufficiently flexible to permit its being shaped to follow an edge of serpentine configuration as well. Additionally, it will be noted that track 10 may also be shaped to conform to a workpiece of cone-shaped configuration or a combination of any of the shapes hereinbefore described.

FIG. 1 illustrates a typical application for the track modules of the present invention. In this application, a pair of track modules are attached to a cylindrical workpiece W by vacuum pressure generated by a pump P which connects to the passageways 22 of the tracks 10 through conduits H. A tool holding carriage C mounts on the track 10 by means of sets of rollers depending from the four corners of the carriage in contact with the track rails 24. Each set comprises three rollers; one engaging the front surface 26; another engaging back surface 28; and the third engaging side surface 30.

A variable speed motor M mounted on the carriage C is provided with a gear G secured to the shaft of the motor M. Gear G engages the teeth 40 of the track 10 propelling carriage C along track 10 upon energization of the motor M. A welding torch T is supported on the carriage C by a bracket B. In lieu of torch T, other tools may be substituted for machining purposes such as grinders or milling cutters. However, it is to be noted that the carriage C together with its parts and accessories, is not a part of the present invention but is herein described as an example of an application in which track 10 is well suited.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A track for supporting a tool holding carriage onto a workpiece comprising:
   a base having front, back and side surfaces,
   rail means having front, back and side surfaces,
   said rail means projecting laterally from said side surfaces of said base,
   said base having a vacuum chamber integral therewith for securing said track onto a workpiece,
   passageways in said base in communication with said vacuum chamber for connection with an evacuation means, and
   said track being of flexible material whereby said track may be configured to conform to the configuration of said workpiece.

2. The track of claim 1 wherein traction means is embodied in said front of said base for use in propelling said toolholding carriage therealong.

3. The track of claim 1 wherein the material is a fiber-resin composition.